United States Patent [19]
Yui

[11] Patent Number: 6,134,708
[45] Date of Patent: Oct. 17, 2000

[54] PROGRAM COMPILATION EXECUTION SYSTEM

[75] Inventor: Tomoyuki Yui, Tokyo, Japan

[73] Assignee: NEC Corporation, Tokyo, Japan

[21] Appl. No.: 09/016,666

[22] Filed: Feb. 3, 1998

[30] Foreign Application Priority Data

Feb. 13, 1997 [JP] Japan ................................. 9-044658

[51] Int. Cl.[7] ...................................................... G06F 9/45
[52] U.S. Cl. ........................ 717/5; 717/6; 717/8; 717/10
[58] Field of Search ................................ 717/5, 6, 8, 10;
709/108; 712/228, 203; 711/212

[56] References Cited

U.S. PATENT DOCUMENTS

| | | | |
|---|---|---|---|
| 4,499,539 | 2/1985 | Vosacek | 707/205 |
| 5,381,550 | 1/1995 | Jourdenais et al. | 717/6 |
| 5,481,708 | 1/1996 | Kukol | 717/9 |
| 5,715,430 | 2/1998 | Hirayama | 711/141 |
| 5,860,138 | 1/1999 | Engebretsen et al. | 711/202 |

FOREIGN PATENT DOCUMENTS 02136930  5/1990  Japan .
403241431 10/1991 Japan .
7-78092  3/1995  Japan .

OTHER PUBLICATIONS

Heggy et al., "Architecture Support for Register Allocation in the Presence of Aliasing," Proceedings of Supercomputing '90, IEEE Nov. 12–16, 1990, pp. 730–739.

Primary Examiner—Tariq R. Hafiz
Assistant Examiner—Tuan Q. Dam
Attorney, Agent, or Firm—Young & Thompson

[57] ABSTRACT

There is provided a program compilation execution system which uses an in-task shared data allocation system in which by allocating only the data used in a task on a main memory, the operation efficiency of main memory can be enhanced. A compiler 20 transmits to an object program 40 the group information for a variable designated in a source program 10. A linker 50 continuously allocates variables belonging to the same group in each group, and transmits a memory allocation size information of each group to an execution format file 70. When generating the task, a program execution portion 80 obtains from the execution format file the allocation size information relative to the group information designated in an argument, and allocates a region of an in-task shared variable on a memory.

20 Claims, 9 Drawing Sheets

Fig. 7

```
    int  a[10] ;
    int  a[5] ;          701     DECLARATION OF VARIABLES a TO d
  char   a[1000] ;
  char   a[2000] ;

#pragma task_alloc(a,1)     702
#pragma task_alloc(b,1)         DIRECTIVE LINE
#pragma task_alloc(c,2)                       703
       .
       .                        ACTIVATE FUNCTION task1
       .                        AS TASK
  task_create(task1,1) ;        ALLOCATE VARIABLES
       .                        OF GROUP 1 TO MEMORY WHEN
       .                        ACTIVATING
       .                                       704
  task1() {                     DECLARATION OF ENTITY
       .                        OF FUNCTION task1
       .
       .
       PROCESSING WITH REFERENCE
       TO VARIABLE a, b
       .
       .
       .
  }
```

FIG. 8

| | GROUP NUMBER | SIZE OF GROUP SECTION 300 |
|---|---|---|
| ADDRESS 1000 | 0 | 2000 |
| ADDRESS 1008 | 1 | 60 |
| ADDRESS 1016 | 2 | 1000 |

SYMBOL TABLE OF VARIABLE a IN OBJECT PROGRAM

Fig.9(A)

| VARIABLE NAME | : a |
|---|---|
| GROUP INFORMATION | : 1 |
| ⋮ | |

200

SYMBOL TABLE OF VARIABLE b IN OBJECT PROGRAM

Fig.9(B)

| VARIABLE NAME | : b |
|---|---|
| GROUP INFORMATION | : 1 |
| ⋮ | |

200

SYMBOL TABLE OF VARIABLE c IN OBJECT PROGRAM

Fig.9(C)

| VARIABLE NAME | : c |
|---|---|
| GROUP INFORMATION | : 2 |
| ⋮ | |

200

SYMBOL TABLE OF VARIABLE d IN OBJECT PROGRAM

Fig.9(D)

| VARIABLE NAME | : d |
|---|---|
| GROUP INFORMATION | : 0 |
| ⋮ | |

200

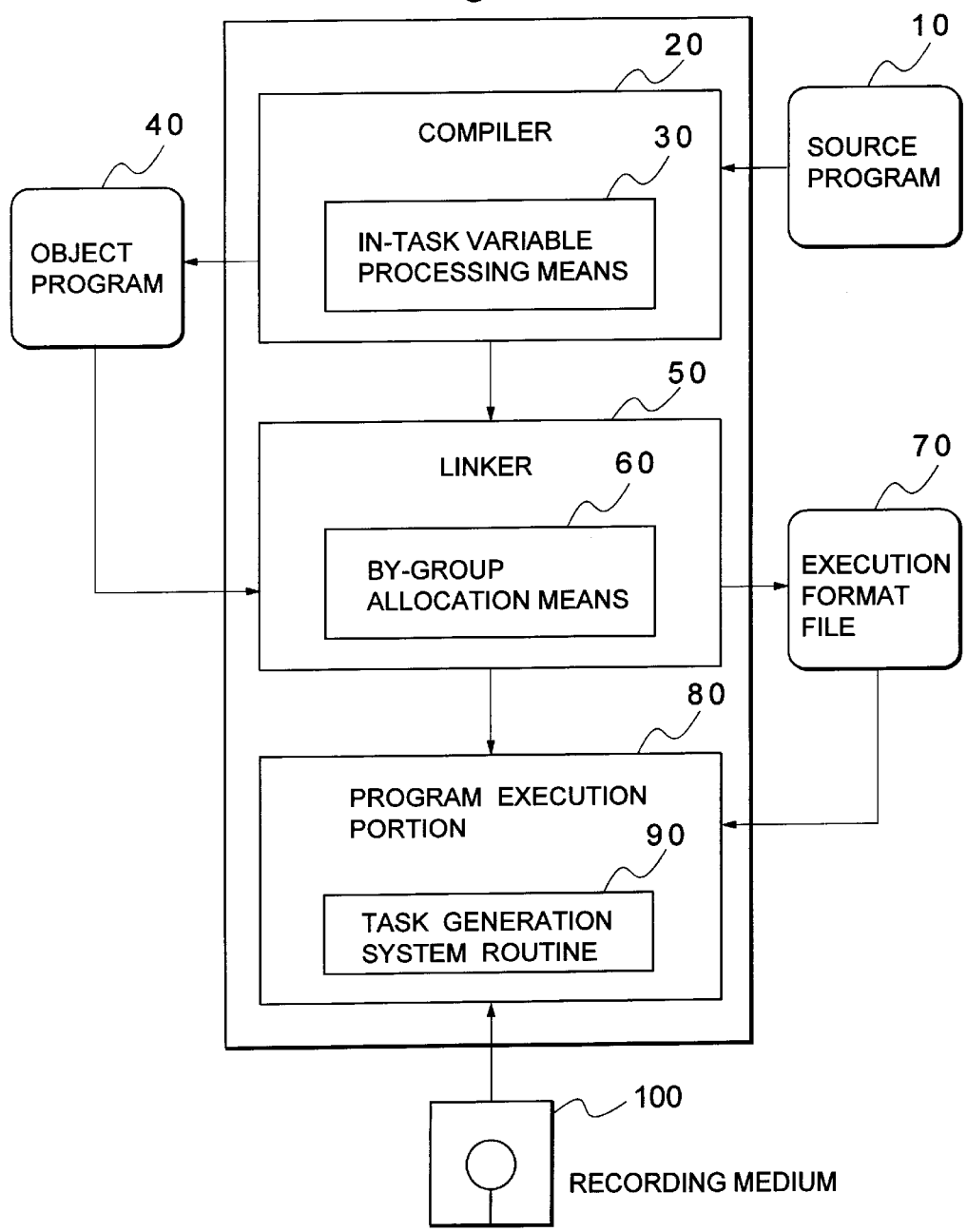

PROGRAM COMPILATION EXECUTION SYSTEM

BACKGROUND OF THE INVENTION

1. Field of the Invention

The present invention relates to a program compilation execution system which comprises a compiler for compiling a source program and generating an object program, a linker for receiving the object program and outputting an execution format file and a program execution portion for executing the execution format file, and especially to a program compilation execution system in which when a program is compiled and executed by dividing the program into plural tasks, an in-task shared data allocation system is used for efficiently allocating a memory used by each task.

2. Description of the Related Art

In a conventional in-task shared data allocation system, for example, as described in Japanese Patent Application Laid-open No. Hei 7-78092, when a batch of processing is divided in tasks for execution, a data region to be used by the tasks is allocated on a main memory of a computer.

FIG. 11 is a block diagram showing a constitution of the above related art. Referring to FIG. 11, numeral 1001 denotes a task switch controller for switching an active task to another task, 1002 denotes a stack data movement controller for relocating each stack in a stack region, and 1003 denotes a stack information memory for storing stack address information. Also, numeral 1004 is a stack pointer for pointing a position in the stack region. Data is outputted or inputted at the position pointed by the stack pointer. Numeral 1005 denotes a stack region in which stack data for the respective tasks are stored in a batch, and is constituted of an empty region 1005a in which data is not yet stored and a stack data group 1005b in which data is already stored. A boundary address 1006 between the empty region 1005a and the stack data group 1005b varies in accordance with the amount of the stored stack data. The boundary address 1006 is constantly pointed by the stack pointer 1004.

The stack region 1005 will be described in more detail with reference to FIG. 12. FIG. 12 shows a condition in which the active task is switched from task 1 to task 3. FIG. 12A shows the stack region 1005 before the task is switched, while FIG. 12B shows the stack region 1005 after the task is switched.

In the stack region 1005, the stack data group 1005b is divided into stack data 1011 to 1014 for respective tasks 1 to 4. These stack data are not provided with individual empty regions, but instead the empty region 1005a is provided in common.

As shown in FIG. 12A, before the task is switched, the task 1 is active. Therefore, the stack data 1011 of the task 1 is adjacent to the empty region 1005a. The boundary address 1006 between the common empty region 1005a and the stack data 1011 is pointed by the stack pointer 1004, from or to which data can be outputted or inputted. Specifically, when fetching data, data is fetched into the common empty region 1005a, which thus becomes a part of the stack data 1011. On the other hand, data is fetched from the stack data 1011, thereby enlarging the common empty region 1005a.

As shown in FIG. 12B, after the task is switched, the task 3 becomes a starting task. Therefore, the stack data 1013 of the task 3 is adjacent to the empty region 1005a. From or to the stack data 1013 data can be outputted or inputted. In this manner, before and after the task is switched, the stack data is moved without moving the stack pointer 1004.

Operation of the stack data switch device constituted as mentioned above will be described. First, when a request for switching the task arises, the task switch controller 1001 receives the task switching request. Subsequently, the task switch controller 1001 sends information of start and stop tasks to the stack data movement controller 1002. Subsequently, the stack data movement controller 1002 receives information of each task stack address and stack data size from the stack information memory 1003. Then, the stack data movement controller 1002 moves stack data within the stack data group 1005b of the stack region 1005, so that the stack data of the starting task is brought to the stack address pointed by the stack pointer 1004. Subsequently, the stack data movement controller 1002 stores the information of each stack address and stack data size in the stack information memory 1003 in accordance with the moved stack data.

Operation in the stack region 1005 will be described with reference to FIG. 12. First, as shown in FIG. 12A, before the task is switched, the stack data 1014 of the task 4 is in the deepest position, the stack data 1013 of the task 3 is next to the stack data 1014, and the stack data 1012 of the task 2 is next to the stack data 1013. Then, in the shallowest position, the stack data 1011 of the task 1 being active is present in the stack address pointed by the stack pointer 1004.

When the active task is switched from the task 1 to the task 3 in the above stack condition, the stack data of each task is moved as shown in the stack region 1005 of FIG. 12B.

First, the stack data 1013 of the task 3 is moved to the stack address pointed by the stack pointer 1004. Subsequently, the stack data 1011 of the task 1 and the stack data 1012 of the task 2 which have been in the position shallower than that of the stack data 1013 are moved to the position deeper than that of the stack data 1013. The stack data 1014 of the task 4 is not moved and stays as it is.

As aforementioned, by moving the stack data of each task without switching the stack pointer 1004, one empty region can be shared by respective tasks. Therefore, only the stack region necessary for the entire device may be reserved, thereby saving wastes resulting when a stack region is reserved for each task.

However, in the aforementioned conventional stack data switch device, there is a problem that an initial stack size which is allocated when starting each task is necessarily fixed on the stack. Specifically, if the initial stack region of each task has therein a region which is not actually used by the task, the unused region is secured on the stack. Thus, memory is wasted.

This problem arises especially in the case where in a shared memory multiprocessor system, a program is executed by dividing the program into plural tasks, each task is executed on a separate CPU and variables declared globally in the program have to be secured in a separate region for each task. This is because all the variables declared globally are reserved in the stack region of each task.

Specifically, even the global variable which is unnecessary for some task is reserved in the initial stack region of the task. In other words, when the number of tasks is N and the size of the global variable is S, the stack region having a size of N*S is secured in the entire system. If S has a relatively large value, the size of N*S in some case becomes larger than the stack size of the system. Therefore, the program cannot be executed, and another problem arises.

Also, in the conventional stack data switch device, the data instead of the stack pointer is moved. Therefore, another problem is that overhead for moving the data is enlarged in proportion to the size of the data region.

An object of the present invention is to provide a program compilation execution system using an in-task shared data allocation system in which by allocating only the data to be used in a task to a main memory region of the task, the operation efficiency of the main memory region can be enhanced.

Another object of the invention is to provide a program compilation execution system using an in-task shared data allocation system which can prevent overhead at the time of switching a task from increasing in proportion to the amount of data generated when switching stack data as in a conventional art.

SUMMARY OF THE INVENTION

To attain these or other objects, a first program compilation execution system of the present invention comprises:

first means which receives a source program including description for generating at least one task and outputs an object program obtained by compiling the source program and information for dividing variables in the source program into groups;

second means which receives the object program and the group dividing information, generates an execution format file from the object program and outputs the file, while outputting correspondence information of a group and variables belonging to the group (correspondence information of a group and the sum of sizes of variables belonging to the group) based on the group dividing information; and third means which receives and executes the execution format file and controls in such a manner that when the at least one task is generated, each task reserves a region with a size necessary for the variables belonging to the group corresponding to the task (or a region with a size equal to the sum of sizes of the variables belonging to the group corresponding to the task) on a memory by referring to the correspondence information.

In a second program compilation execution system, the first means obtains the group dividing information of each variable from the description in the source program and transmits the information into the object program.

In a third program compilation execution system, the second means obtains the group dividing information of each variable from the object program and transmits the correspondence information of the group and the variables belonging to the group into the execution format file.

In a fourth program compilation execution system, the first means is provided in a compiler as a part of a function of analyzing syntax of the source program, and the second means is provided in a linker as a part of a function of determining allocation addresses of the variables on the memory.

BRIEF DESCRIPTION OF THE DRAWINGS

FIG. 7 shows a concrete example of the source program in the embodiment of the invention.

FIG. 8 shows a concrete example of the group section management table in the execution format file in the embodiment of the invention.

FIGS. 9A to 9D show a concrete example of the symbol table entry in the object program in the embodiment of the invention.

FIG. 10 is a block diagram showing a constitution of a program compilation execution system according to a second embodiment of the invention.

DETAILED DESCRIPTION OF THE PREFERRED EMBODIMENT

A first embodiment of the invention will be described in detail with reference to the accompanying drawings.

Figure 1:
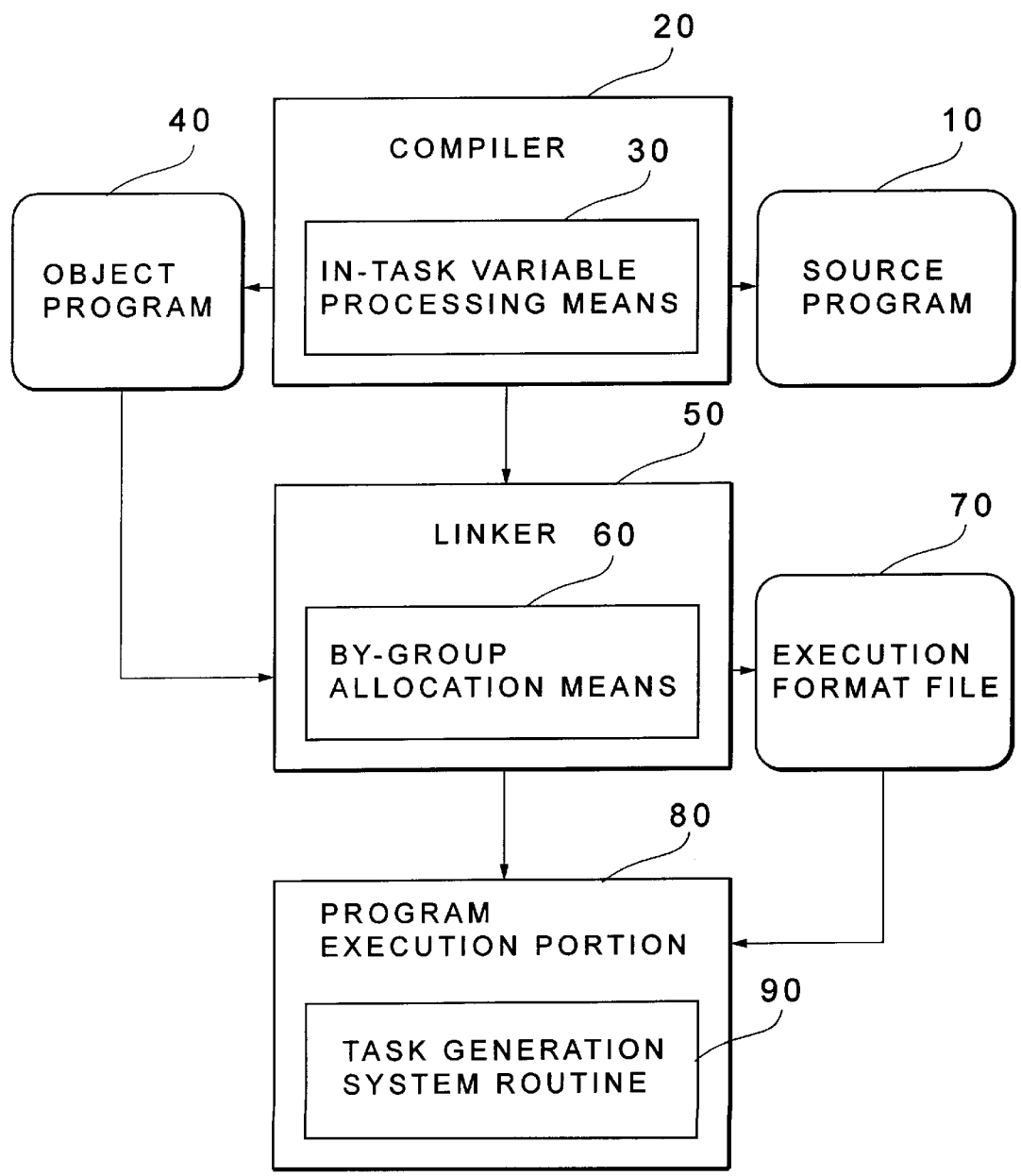
FIG. 1 is a block diagram showing a constitution of a program compilation execution system according to a first embodiment of the invention.

Referring to FIG. 1, the program compilation execution system according to the first embodiment of the invention includes a source program 10, a compiler 20, an object program 40, a linker 50, an execution format file 70 and a program execution portion 80.

Further, the compiler 20 includes an in-task variable processing means 30, the linker 50 includes a by-group allocation means 60, and the program execution portion 80 includes a task generation system routine 90.

The compiler 20 receives the source program 10 and outputs the object program 40. The in-task variable processing means 30 is activated by the compiler 20. When the source program 10 has a directive line which indicates to which group an in-task variable is to be allocated, the means 30 stores variable allocation group information designated by the directive line in the source program 10 into a symbol table corresponding to the variable in the object program 40.

The linker 50 receives the object program 40 and outputs the execution format file 70. The by-group allocation means 60 is activated by the linker 50. When the variable allocation group is designated in the symbol table in the object program 40, the means 60 allocates data in such a manner that allocation regions become continuous in each group.

In the program execution portion 80, the task which is generated by passing group information as an argument to the task generation system routine 90 allocates only the region of the variable included in the designated group.

Operation of the first embodiment according to the invention will be described in detail with reference to FIGS. 1 to 5.

Figure 2:
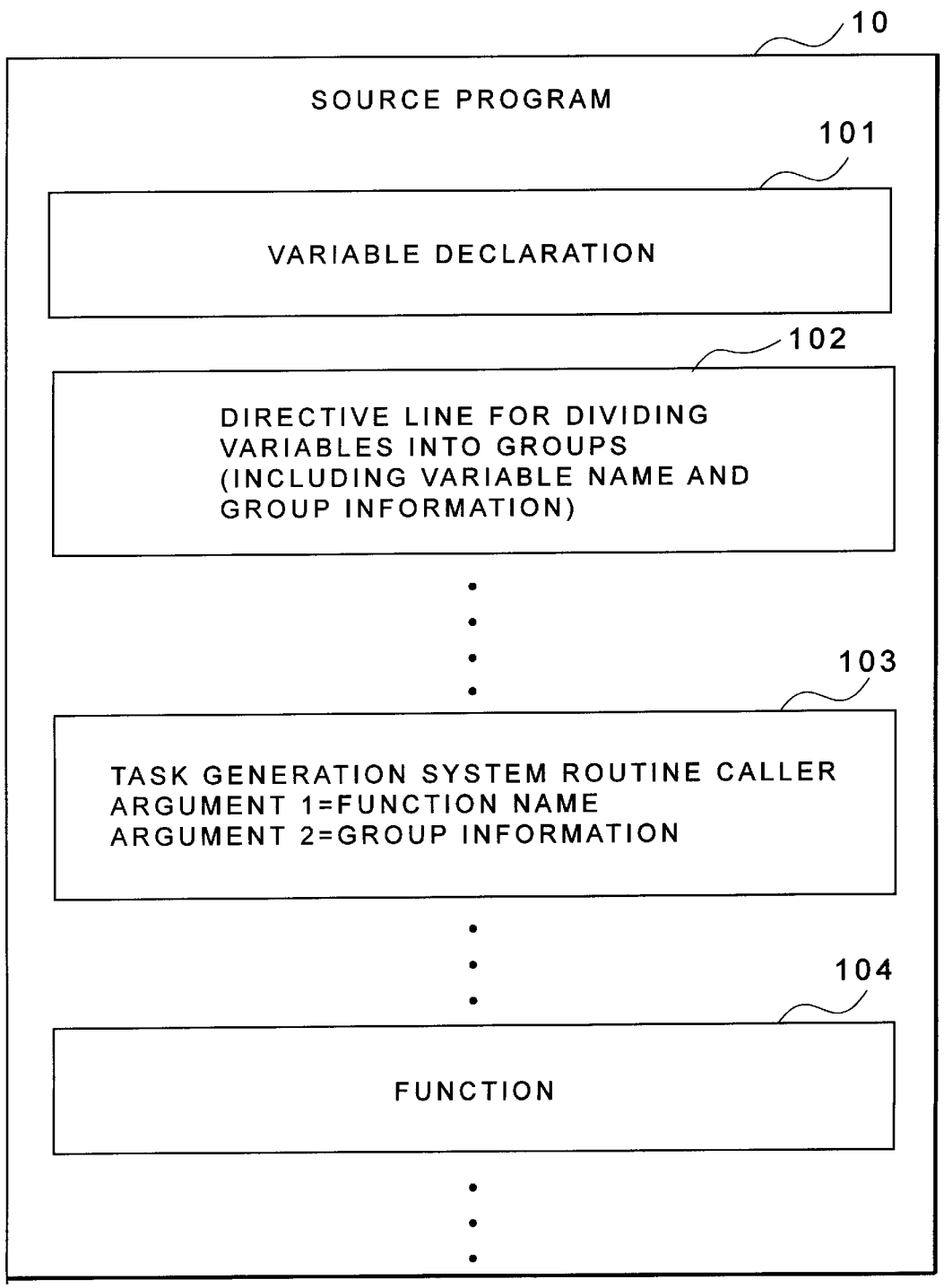
FIG. 2 shows a constitutional example of a source program in the embodiment of the invention.

As shown in FIG. 2, the source program 10 includes a series of processing as a unit of task (hereinafter, referred to as the function 104), a caller 103 of the task generation system routine 90 for activating the function 104 as a task, a declaration 101 of the variables to be used in the program and directive lines 102 for dividing the variables into groups.

Arguments of the caller 103 in the task generation system routine 90 include a name of a function which is a task, and group information of variables used by the generated task. Also, the directive lines 102 for dividing the variables into groups includes variable names and group information by which variable groups are identified.

Figure 5:
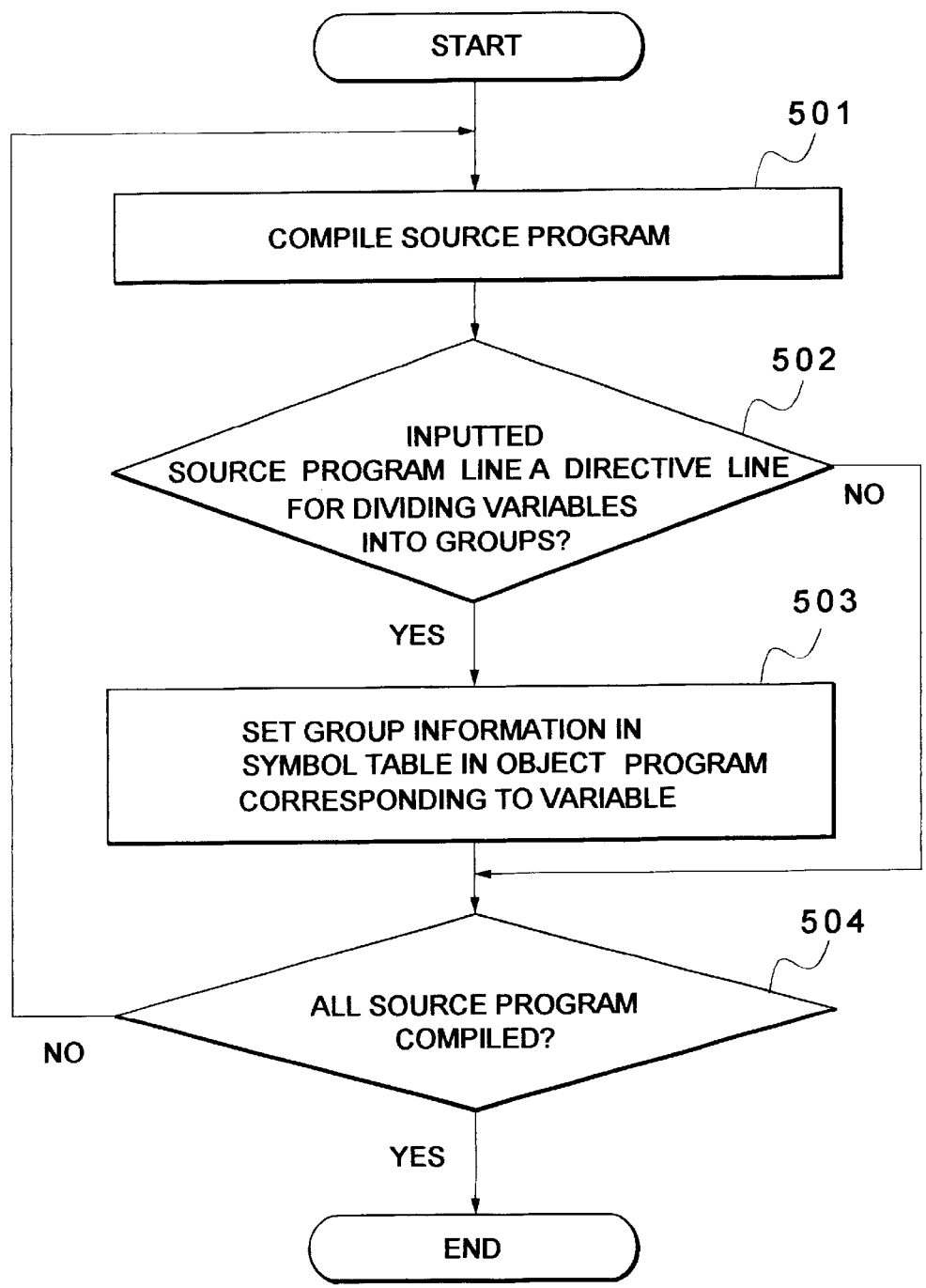
FIG. 5 is a flowchart showing a processing of a compiler in the program compilation execution system according to the invention.

Referring to FIG. 5, the compiler 20 receives the source program 10 and compiles the program by each line to generate the object program 40 (step 501). When the directive lines 102 for dividing variables into groups arise in the source program 10 (YES at step 502), the compiler 20 activates the in-task variable processing means 30. The in-task variable processing means 30 sets the group information designated by the directive lines 102 as information to entry of a symbol table 200 corresponding to the variable name in the object program 40 (step 503). The above steps 501 to 503 are repeated until all the lines of the source program 10 are compiled (NO at step 504). Additionally, if the directive lines for dividing variables into groups are not designated with regard to the variables declared in the program, the information known as the group information is set as the information to the entry of the symbol table 200 of the corresponding variable in the object program 40.

Figure 3:
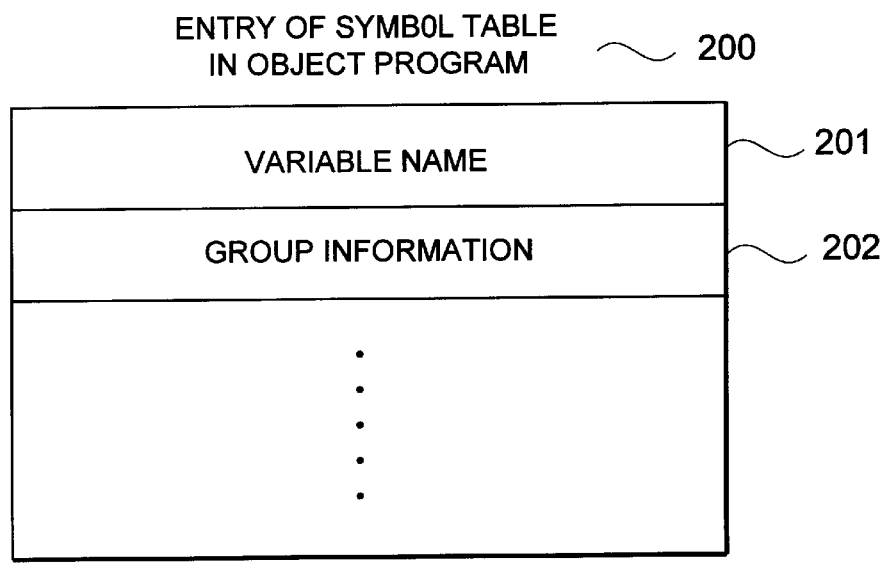
FIG. 3 shows a constitutional example of a symbol table entry in an object program in the embodiment of the invention.

As aforementioned, in the symbol table 200 in the object program 40 generated by the compiler 20, with regard to all the variables, as shown in FIG. 3, set is correspondence information of a variable name 201 and group information 202 indicating to which group the pertinent variable belongs.

Figure 4:
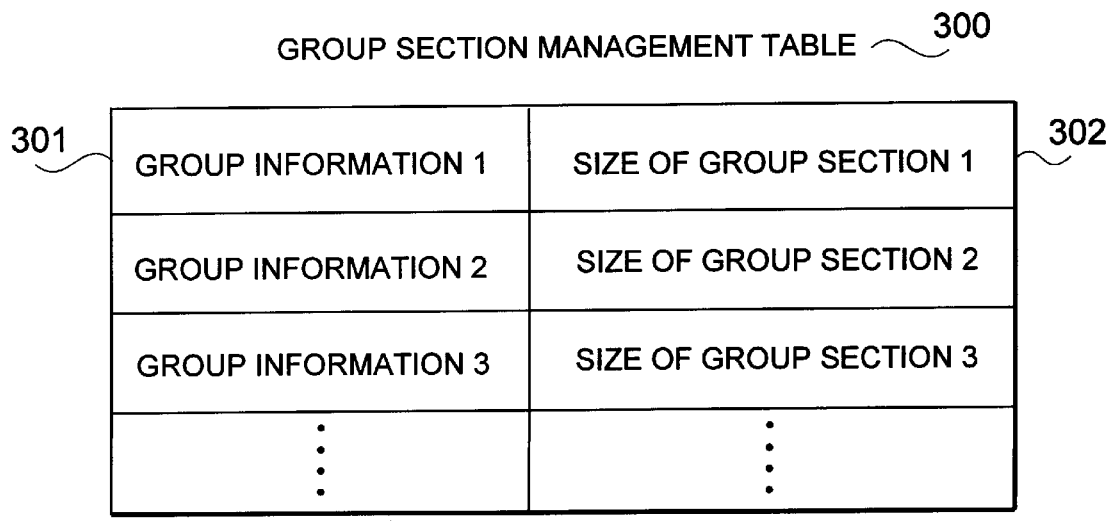
FIG. 4 shows a constitutional example of a group section management table in an execution format file in the embodiment of the invention.

Subsequently, the linker 50 receives the object program 40, and determines a memory address to which the variable is allocated based on the symbol table 200 in the object program 40. The by-group allocation means 60 reads the symbol table 200 from the object program 40 and couples the variable allocation address to each group information in the symbol table 200. Specifically, by assuming a virtual memory region which has address "0" on the top of each group, variables are allocated sequentially from the top of each group to which each of the variables belongs. At this time, a combination of group information 301 and group section size 302 of the virtual memory region (hereinafter, referred to as the group section) generated for each group is registered in a group section management table 300 as shown in FIG. 4. The group section management table 300 is transmitted to the execution format file 70.

Thereafter, the program execution portion 80 executes the execution format file 70 of the source program 10. When generating the task, the caller 103 of the task generation system routine 90 is executed. The task generation system routine 90 receives the group information as the argument, obtains the memory allocation size of the group information from the group section management table 300 of the execution format file 70, and reserves a region equal in size to the memory allocation size on the memory when generating the task.

Operation of the embodiment as mentioned above will be described in more detail.

Figure 6:
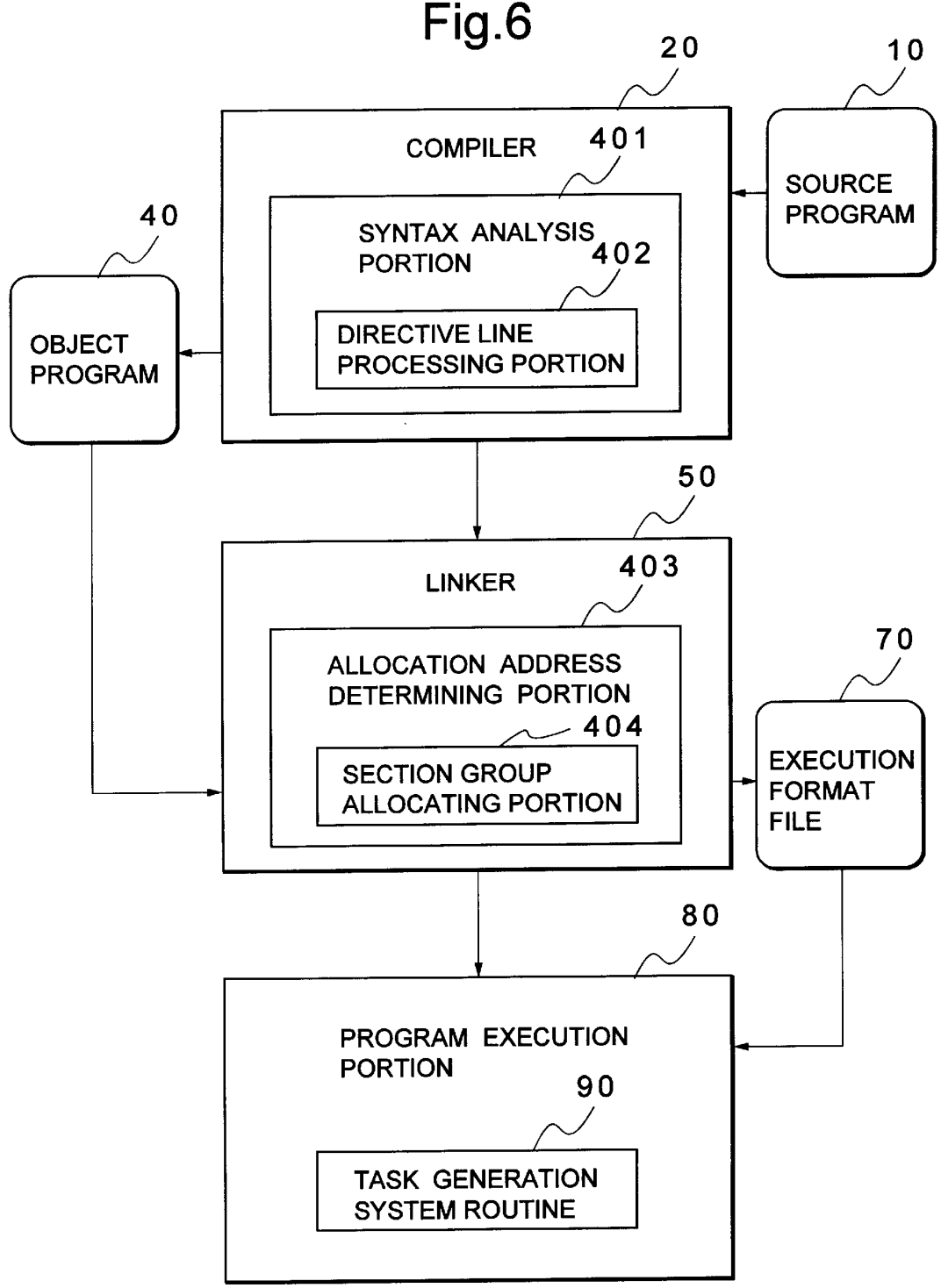
FIG. 6 is a block diagram showing a constitution of the program compilation execution system according to the invention.
Figure 11:
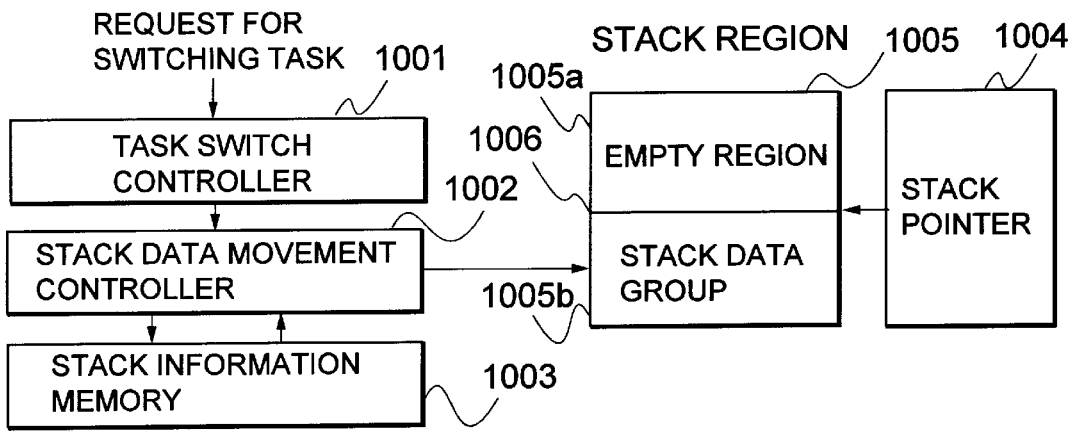
FIG. 11 is a block diagram showing a constitution of a conventional stack data switch device.
Figure 12:
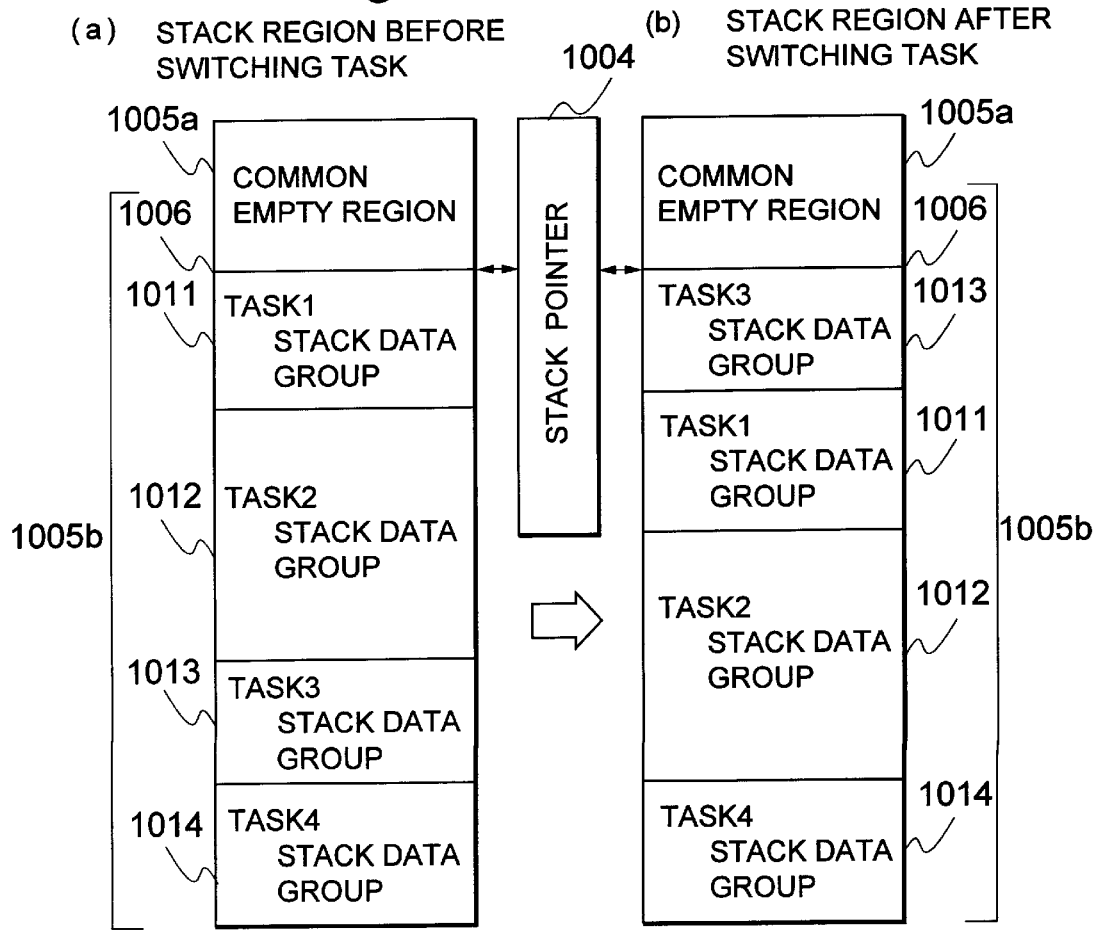
FIGS. 12A and 12B show in detail transitions between states in the conventional stack switch device shown in FIG. 11.

Referring to FIG. 6, the compiler 20 is provided with a syntax analysis portion 401 which is further provided with a directive line processing portion 402 having the aforementioned function of the in-task variable processing means 30. Also, the linker 50 is provided with an allocation address determining portion 403 which is further provided with a section group allocating portion 404 having the aforementioned function of the by-group allocation means 60.

Also, the task generation system routine 90 allocates an inherent region of each task on the stack. Referring to FIG. 7, the source program 10 is described in language C and uses a directive line "progma". Here, the name of the task generation system routine 90 is "task_create". The name of the function which is activated as the task is designated as the first argument, while the group information indicated by 1 or more integer value is designated as the second argument. Referring to FIG. 8, the linker 50 allocates the group section management table 300 from address 1000 in the memory.

Referring to FIG. 7, the source program 10 includes a declaration 701 of variable names a to d, a directive line 702 indicating to which group each of the variables a to c is to be allocated, a caller 703 of the task generation system routine and a declaration 704 of a function as a task. Here, allocation sizes of the variables a to d are 40 bytes, 20 bytes, 1000 bytes and 2000 bytes, respectively.

The compiler 20 reads the source program 10 and complies the program line by line. First, the variable declaration 701 is inputted. Therefore, for each of the variables a to d, the symbol table 200 is transmitted to the object program 40. The symbol table 200 has fields for storing a variable name, type and group number. For the processing of the variable declaration 701, the syntax analysis portion 401 beforehand sets the variable name and type in the symbol table 200, and sets "0" as the known group information in the field of the group number.

Subsequently, the directive lines "progma" are inputted as the directive lines 702 for allocating the variables to groups. Here, the directive lines "progma" indicate that the variables a and b are allocated to group 1 and the variable c is allocated to group 2. Based on the directive lines 702, the directive line processing portion 402 sets "1" in the group number fields of the symbol table 200 for the variables a and b in the object program 40 as shown in FIGS. 9A and 9B, and sets "2" in the group number field in the symbol table 200 for the variable c as shown in FIG. 9C. Consequently, the symbol table 200 in the object program 40 is prepared as shown in FIGS. 9A to 9D.

Subsequently, the linker 50 is activated to generate the execution format file 70 based on the information of the object program 40. The allocation address determining portion 403 of the linker 50 determines the on-memory address of the variable of each symbol table 200 in the object program 40. At this time, allocation sections (group sections) are divided by the group numbers in the symbol table 200.

Specifically, the variable a is allocated to a region starting from address 0 of a group section 1, and the variable b is allocated to a region starting from address 40 next to the region of the variable a in the group section 1. Further, the variable c is allocated to a region starting from address 0 of a group section 2, and the variable d is allocated in a region starting from address 0 in a group section 0. The sizes of the group sections 0 to 2 are 2000 bytes, 60 bytes and 1000 bytes, respectively.

Subsequently, as shown in FIG. 8, the allocation address determining portion 403 allocates the group section management table 300 to address 1000. In the group section management table 300, a combination of the group number and the corresponding group section size is set.

The execution format file 70 is executed, and the task generation system routine 90 is called. Then, the task generation system routine 90 searches sequentially from the address 1000 for the entry of the group section management table 300 which has the same group number as the group number "1" passed as the second argument.

Here, at address 1008 the entry of the number "1" is found, and from the entry the size of the group section with the group number "1" of 60 bytes is obtained. The task generation system routine 90 allocates a region with a size of 60 bytes on the stack, and activates a function "task1" designated in the first argument as one task.

Specifically, when the function "task 1" is activated as the task, by dividing the variables into groups, the size of the memory allocated on the stack becomes 60 bytes. On the other hand, when the variables are not divided into groups, the size is 1060 bytes. Therefore, the memory region of 1060−60=1000 bytes is saved.

A second embodiment of the invention will be described in detail with reference to the drawings.

Referring to FIG. 10, in the second embodiment of the invention, there is provided a recording medium 100 in which a program compilation execution program is recorded. In this case, the compiler 20 (including the in-task variable processing means 30), the linker 50 (including the by-group allocation means 60) and the program execution portion 80 (including the task generation system routine 90) perform the same operation as the means described in the first embodiment, under the control of the program compilation execution program which is recorded in the recording medium 100. Additionally, the recording medium 100 may be a magnetic disc, a semiconductor memory or another recording medium.

As aforementioned, according to the program compilation execution system which uses the in-task shared data allocation system of the invention, first, by allocating only the data used in the task in the main memory region of the task, the operation efficiency of the main memory region can be advantageously enhanced.

Secondly, there is obtained another advantage that overhead at the time of switching the task is prevented from increasing in proportion to the amount of the data generated when the stack data is switched as in the conventional art. This is because the data used in the task is allocated on the stack, but the data itself on the stack is not moved different from the conventional art.

What is claimed is:

1. A program compilation execution system comprising:
   first means which receives a source program including description for generating at least one task and outputs an object program obtained by compiling said source program and information for dividing variables in said source program into groups;
   second means which receives said object program and said group dividing information, generates an execution format file from said object program and outputs said execution format file, while outputting correspondence information of a group and variables belonging to the group based on said group dividing information; and
   third means which receives and executes said execution format file and controls in such a manner that when said at least one task is generated, each task reserves a region with a size necessary for the variables belonging to the group corresponding to the task on a memory by referring to said correspondence information.

2. The program compilation execution system as claimed in claim 1, wherein said first means obtains said group dividing information of each variable from the description in said source program and transmits the group dividing information into said object program.

3. The program compilation execution system as claimed in claim 2, wherein said second means obtains said group dividing information of each variable from said object program and transmits said correspondence information of the group and the variables belonging to the group into said execution format file.

4. The program compilation execution system as claimed in claim 3, wherein said first means is provided in a compiler as a part of a function of analyzing syntax of the source program, and
   said second means is provided in a linker as a part of a function of determining allocation addresses of the variables on the memory.

5. A program compilation execution system comprising:
   first means which receives a source program including description for generating at least one task and outputs an object program obtained by compiling said source program and information for dividing variables in said source program into groups;
   second means which receives said object program and said group dividing information, generates an execution format file from said object program and outputs said execution format file, while outputting correspondence information of a group and the sum of sizes of variables belonging to the group based on said group dividing information; and
   third means which receives and executes said execution format file and controls in such a manner that when said at least one task is generated, each task reserves a region with a size equal to the sum of sizes of the variables belonging to the group corresponding to the task on a memory by referring to said correspondence information.

6. The program compilation execution system as claimed in claim 5, wherein said first means obtains said group dividing information of each variable from the description in said source program and transmits the group dividing information into said object program.

7. The program compilation execution system as claimed in claim 6, wherein said second means obtains said group dividing information of each variable from said object program and transmits said correspondence information of the group and the variables belonging to the group into said execution format file.

8. The program compilation execution system as claimed in claim 7, wherein said first means is provided in a compiler as a part of a function of analyzing syntax of the source program, and
   said second means is provided in a linker as a part of a function of determining allocation addresses of the variables on the memory.

9. A method for compiling and executing a program comprising:
   receiving a source program including description for generating at least one task and outputting an object program which is obtained by compiling said source program and information for dividing variables in said source program into groups;
   receiving said object program and said group dividing information, generating an execution format file from said object program and outputting said execution format file, while outputting correspondence information of a group and variables belonging to the group based on said group dividing information; and
   receiving and executing said execution format file and controlling in such a manner that when said at least one task is generated, each task reserves a region with a size necessary for the variables belonging to the group corresponding to the task on a memory by referring to said correspondence information.

10. The method for compiling and executing the program as claimed in claim 9, wherein said group dividing information of each variable is obtained from the description in said source program and transmitted into said object program.

11. The method for compiling and executing the program as claimed in claim 10, wherein said group dividing information of each variable is obtained from said object program, and said correspondence information of the group and the variables belonging to the group is transmitted into said execution format file.

12. A method for compiling and executing a program comprising:

receiving a source program including description for generating at least one task and outputting an object program which is obtained by compiling said source program and information for dividing variables in said source program into groups;

receiving said object program and said group dividing information, generating an execution format file from said object program and outputting said execution format file, while outputting correspondence information of a group and the sum of sizes of variables belonging to the group based on said group dividing information; and receiving and executing said execution format file and controlling in such a manner that when said at least one task is generated, each task reserves a region with a size equal to the sum of sizes of the variables belonging to the group corresponding to the task on a memory by referring to said correspondence information.

13. The method for compiling and executing the program as claimed in claim 12, wherein said group dividing information of each variable is obtained from the description in said source program and transmitted into said object program.

14. The method for compiling and executing the program as claimed in claim 13, wherein said group dividing information of each variable is obtained from said object program, and said correspondence information of the group and the variables belonging to the group is transmitted into said execution format file.

15. A computer-readable medium comprising:

a computer-readable data storage device; and a program stored on said device, said program causing a computer:

to receive a source program including description for generating at least one task and output an object program obtained by compiling said source program and information for dividing variables in said source program into groups;

to receive said object program and said group dividing information, generate an execution format file from said object program and output said execution format file, while outputting correspondence information of a group and variables belonging to the group based on said group dividing information; and to receive and execute said execution format file and controlling in such a manner that when said at least one task is generated, each task reserves a region with a size necessary for the variables belonging to the group corresponding to the task on a memory by referring to said correspondence information.

16. The computer-readable medium as claimed in claim 15, wherein said group dividing information of each variable is obtained from the description in said source program and transmitted into said object program.

17. The computer-readable medium as claimed in claim 16, wherein said group dividing information of each variable is obtained from said object program, and said correspondence information of the group and the variables belonging to the group is transmitted into said execution format file.

18. A computer-readable medium comprising:

a computer-readable data storage device; and a program stored on said device, said program causing a computer:

to receive a source program including description for generating at least one task and output an object program obtained by compiling said source program and information for dividing variables in said source program into groups;

to receive said object program and said group dividing information, generate an execution format file from said object program and output said execution format file, while outputting correspondence information of a group and the sum of sizes of variables belonging to the group based on said group dividing information; and to receive and execute said execution format file and control in such a manner that when said at least one task is generated, each task reserves a region with a size equal to the sum of sizes of the variables belonging to the group corresponding to the task on a memory by referring to said correspondence information.

19. The computer-readable medium as claimed in claim 18, wherein said group dividing information of each variable is obtained from the description in said source program and transmitted into said object program.

20. The computer-readable medium as claimed in claim 19, wherein said group dividing information of each variable is obtained from said object program, and said correspondence information of the group and the variables belonging to the group is transmitted into said execution format file.

* * * * *